Dec. 22, 1936.  M. W. BELKA ET AL  2,065,109
SLOW RECOVERY CONVERTER WATER HEATING SYSTEM
Filed April 21, 1934   2 Sheets-Sheet 2
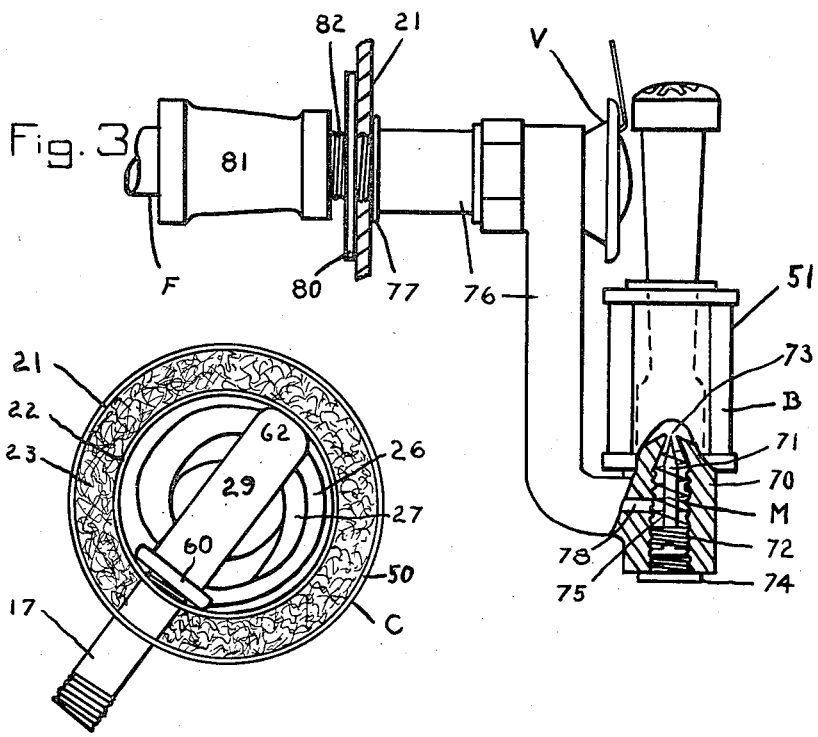
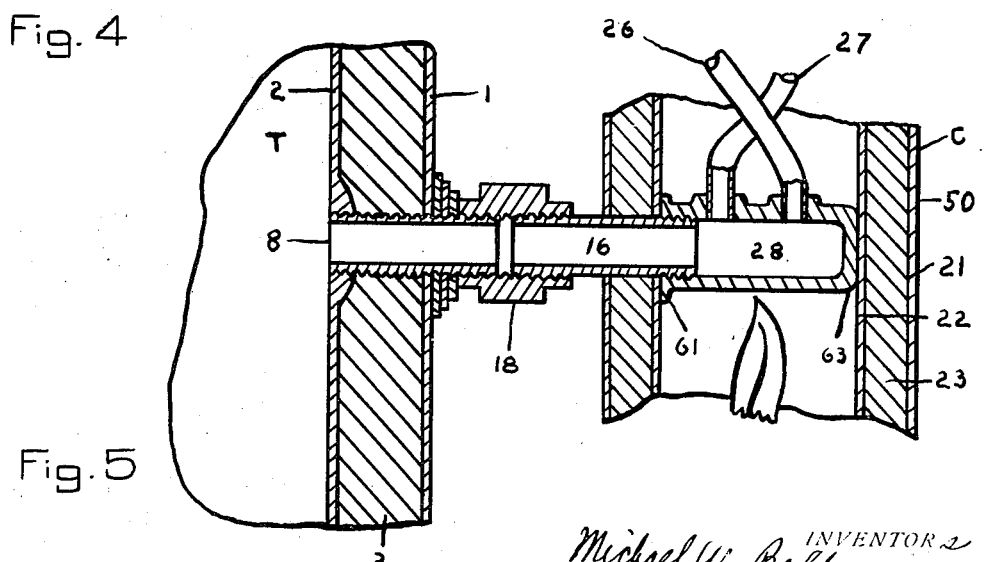

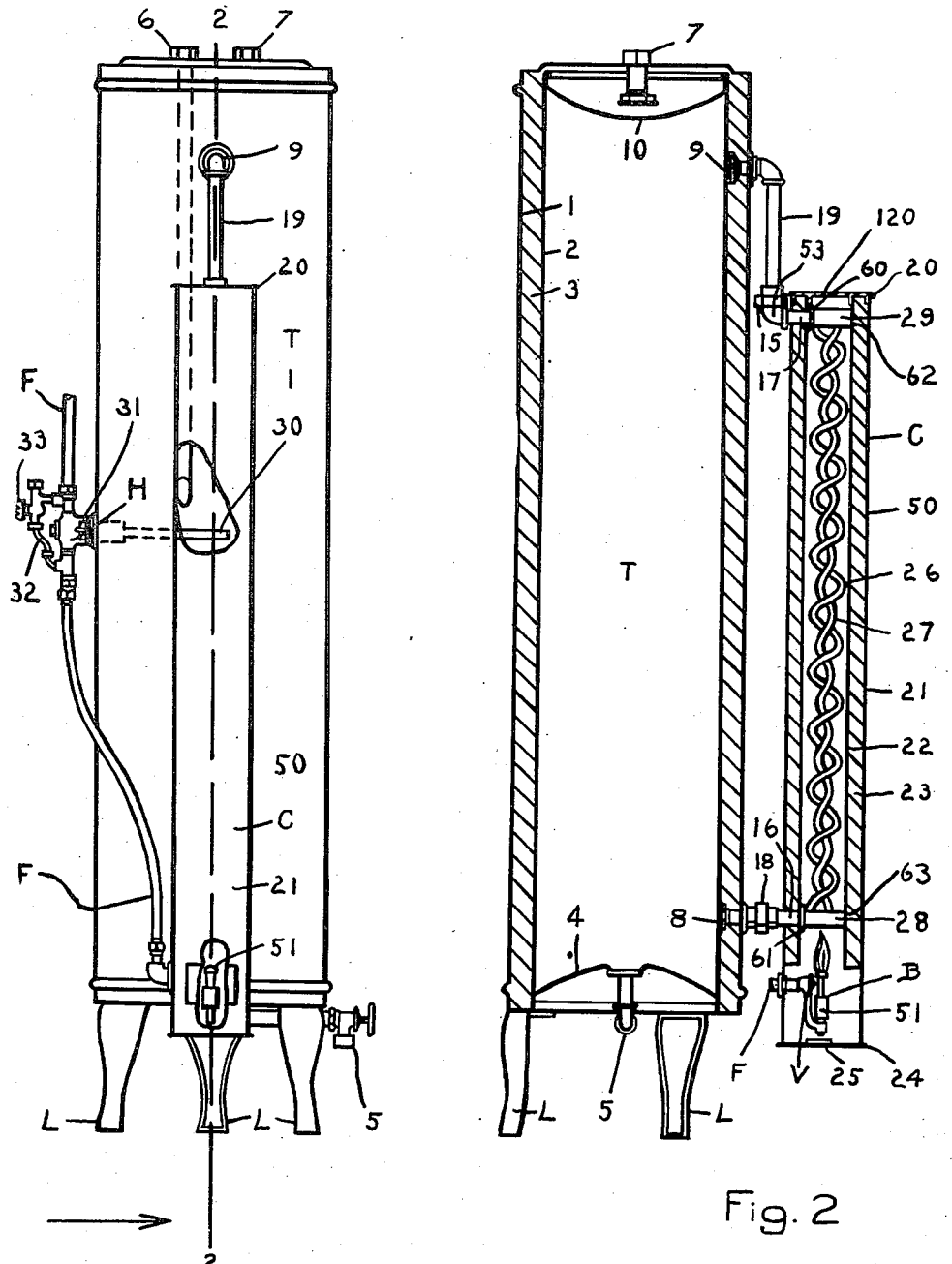

Patented Dec. 22, 1936

2,065,109

UNITED STATES PATENT OFFICE 2,065,109

SLOW RECOVERY CONVERTER WATER HEATING SYSTEM

Michael W. Belka and John F. Wood, Lowell, Mass.

Application April 21, 1934, Serial No. 721,692

2 Claims. (Cl. 122—14)

This invention relates to systems and devices for heating and for providing a constant and sufficient supply of hot water for domestic use.

It is particularly intended for use with a gas heating element to automatically heat and maintain a sufficient volume of hot water to supply the taps of wash basins, sinks, bath tubs, etc. in a single house or apartment.

We are aware that there are what are known as quick recovery systems in which what is known as a converter is used. Such a system includes a member known as a converter which includes a burner of relatively large size at the bottom of a stack of relatively great diameter and low height in which stack is a coil or coils of thin metal pipe which are connected at the bottom with the bottom part of the storage tank and at the top with the top part of the storage tank. These are known as quick recovery circulating converting systems.

We are aware that there is another type known as the slow recovery system in which the burner which may be of relatively small size is located below the tank, but there are flues extending from the burner up into the water of the tank, the idea being that the products of combustion will, through these flues pass through the water in the tank and thereby slowly heat it. Whatever circulation of water there is, is inside of the tank itself as these are not converter systems.

Instead of providing a large, very hot and expensive burner which is in full operation for a relatively short time, as in a quick recovery system, we provide for slow recovery by using a single, low consumption heating member or burner in which the gas and air are thoroughly mixed and which preferably is provided with a shut off valve which will automatically shut off the fuel if the flame goes out. Our system is also provided in the fuel line with another valve operable by a thermostat interposed somewhere in the water circulating system and so arranged that when the water at the thermostat has reached a predetermined heat, the thermostat will operate to turn down the burner so that it will continue to burn, but with a low flame thus dispensing with a pilot light.

When the burner is turned on full, however, it is so proportioned and regulated with reference to the other parts that the recovery of the desired temperature in all the water in the tank will be slow.

We provide a well insulated tank which is preferably of the tubular upright type and we provide proximate thereto an insulated heating stack of relatively small diameter, but relatively great height in which is a water heating member, which preferably is formed of two coils of water tubes, which connect at the bottom with a horizontal holding tube positioned just above the flame of the burner. Said coils are preferably of corkscrew shape and are so intertwined that they will serve as baffles to interrupt the upward flow of the heated air thus causing it to heat the coils to better advantage. These coils are preferably near the surface of the inside of the stack and at the top connect with another horizontal holding tube.

The tank, insulation, stack, water heating member, burner, connections, spud and thermostat all so cooperate that there is a constant, slow circulation and the burner at its low point keeps the water heated enough to circulate and maintain a uniform temperature, but when water is drawn from the taps, there is no sudden, great increase in heat, but a gradual heating.

Moreover, the oxygen in the air is burned so slowly and completely that a vent pipe to the chimney can be omitted and, on account of the small diameter and great height of the stack together with the small size of the burner, there is much less waste heat than where there is a large burner with a relatively large, low stack.

We use a removable fuel flow regulating spud interposed in the fuel line with a passage of such size that the amount of gas or fuel at a given main pressure can be predetermined and a meter can be dispensed with.

The parts can be so adjusted that the water in a tank of a given capacity can be slowly heated during the night and under normal conditions a constant steady supply of hot water is available at all times.

As there is no sudden and great change in the temperature at any part of the coils or heating stack, sweating or the condensation of the water vapor formed in the products of combustion does not condense nor corrode the metal, but is carried off leaving the coils and the stack dry and clean.

When all the parts are properly adjusted, the temperature in the stack and coils will be very nearly constant and uniform.

On account of this relatively constant temperature and by our use of relatively heavy holding tubes near the top and bottom of the stack connected by relatively long lengths of small diameter thin metal heating tubes, we provide a very large heating surface compared to the relatively small volume of water passing through the coils, while the position of the bottom holding tube with reference to the coils and the flame is such that it serves as a baffle and heat distributor thereby contributing to prevent the burning of the thin metal coils by heat or by the weak acids which form in the type of heaters which are constantly changing from hot to cold. These holding tubes also serve as supports for the thin metal coils and protect them at the top and bottom, when in place, from accidental injury and also provide an easy means of putting and holding them in place and removing them for replacement or repairs.

These holding tubes not only serve to protect the smaller, thinner and more delicate heating coils when in place or when being shipped from physical injury, but if through some maladjustment, or for any other reason, weak acids form, they will condense on the bottom tube instead of on the heating tubes. As these holding tubes may have thick walls, as they may be heavy castings, the acid, if any, does little harm.

The bottom holding tube also receives the most concentrated heat from the flame and will, therefore, stand up better and last longer than where the heat is directed closer to the small thin metal coil which may be of copper or other metal more easily affected than iron. This bottom holding tube becomes a strong evaporation point for any acid or moisture; it prevents the flame from impinging on the coil; it gives a heavy heating surface which is larger than any one section of the coil and it also baffles and distributes the heat.

Besides the above advantages, we find it convenient to use the top and bottom holding tubes for supporting the entire converter.

Preferably they are made of a length equal to the diameter of the inside of the heating stack or, if that inside is preferably of thin elastic sheet metal, they may be made to fit tightly and elastically inside so that the parts are held firmly but elastically in place. We then pass nipples at the top and bottom through the wall of the converter and screw them into the top and bottom holding tubes respectively and then connect the other ends of these nipples with suitable elbows or couplings or both carried by the inlet and outlet pipes of the circulating system between the tank and the converter. The whole converter is therefore, supported away from the floor without strain on the tank as all the parts are relatively light.

When any repairs are necessary, the converter can be taken off and replaced by another while repairs are being made and if the coils burn out, after the converter is removed and the nipples unscrewed, the coils and top and bottom holding tubes can be taken out as a unit and a new set of coils and tubes substituted.

In the drawings, Fig. 1 is an elevation of a hot water heating system embodying our idea.

Fig. 2 is a vertical sectional elevation on the line 2, 2 of Fig. 1 looking in the direction of the arrow and with some parts in full lines for clearness.

Fig. 3 is a detailed elevation partly in section showing the preferred type of burner with spud and automatic shut off valve.

Fig. 4 is a plan view of the top of the converter with the cap removed.

Fig. 5 is a detail vertical section of the bottom holding tube with its connecting nipple and other parts by which it is connected to the storage tank.

In the drawings, T represents a hot water storage tank of the vertical tubular type having an inner wall 2, top 10 and bottom 4 together with the outer skin 1 and the insulation 3 between the inside 2 and the outside 1.

5 represents a drain pipe while 6 is the cold inlet water pipe which, as shown, extends well down into the tank and 7 is the hot water outlet pipe which leads to the various taps or other places which are to be supplied with hot water. 8 is a bottom circulating water pipe connection from the tank T to the water heating member or converter C and 9 is a top circulating water pipe connection between tank T and water heating member or converter C.

As shown, the tank T is supported by legs L, L, but the converter C, which includes stack 50, the water heating coils 26, 27, tubes 28 and 29 and fluid burner 51, is wholly supported by the tank T through the medium of the pipe connections which include pipes 18 and 19, which by couplings 18 and 15 and elbow 53 support nipples 16 and 17 which nipples pass through stack 50 and not only support it, but also connect with the relatively heavy metal holding tubes 28 and 29 which are connected by the two reversely wound, corkscrew, thin metal, small diameter heating coils 26 and 27.

While two heating coils are preferred, only one coil or more than two coils might be used.

The stack 50 is light, of relatively small diameter and relatively great height and includes the outer skin 21, inner skin 22 and insulation 23 between them. As shown, it has at the top a cap 20 with a relatively small vent or outlet 120 for the products of combustion.

Skins 21 and 22 are preferably made of Monel metal or some other light, elastic sheet metal and the insulation 23 is of asbestos, mineral, wool or some other light material and coils 26 and 27 are also made of thin, small tubes, while tubes 28 and 29 are preferably just long enough to be pressed inside skin 22 and to snugly fit therein.

Preferably one end 60 or 61 is enlarged and rounded and the other 62 or 63 is rounded.

At the bottom is located the single mixing burner 51 which is so positioned that the top of its arrow-shaped blue flame will be just below the holding tube 28. It is provided with air through an inlet 25 in the bottom cap 24 of the stack and also is connected by means of the fuel pipe line F with any source of liquid or gaseous fuel. This burner is provided with an adjustable fuel flow regulating spud M of such type that the outlet 73 from its nozzle 70 can be changed in size and so set as to deliver not more than a predetermined maximum amount of fuel. The burner is also provided with automatic means V to entirely shut off the fuel supply when the flame stops burning. This may be of any well known means such as shown in the patent to Nachman, Gas refrigerating apparatus, #1,902,715, March 21, 1933 or to Sellman, Safety device for burners, #1,711,398, April 30, 1929 and should be so arranged that if and when the flame from the burner goes out, the fuel supply will be shut off entirely.

We also provide, in the fuel supply pipe F, a thermostat H. This is shown as having an expanding and contracting member 30 which extends into the middle of tank T and which, by well known means, increases or reduces the flow of fuel in accordance with the temperature of the water in the tank T adjoining the member 30.

31 is a regulating member for adjusting the full or maximum flow and 32 is a by-pass provided with a shut off valve 33 by which, if and when at the minimum flow sufficient fuel passes through the pipe 32 to keep the burner B burning low.

Spud M includes nozzle 70 in which is a needle 71 carried by a threaded head 72 by which its position is adjustable, outlet 73, cap 74 and spring 75. Burner B includes and is carried by a bracket pipe 76 which has a collar 77 and a threaded section 82.

Outer skin 21 of converter C is clamped between this collar 77 and a washer 80 when the coupling 81 which is threaded onto pipe F is turned up on the threaded part 82 against washer 80. 78 represents the passage through bracket 76 by which fuel is fed to nozzle 70.

The slow recovery is assured by reducing the delivery of fluid fuel through spud M to such an amount that even if it was being delivered constantly, under the usual pressure, it would not exceed a predetermined amount.

In addition to this, the thermostat H not only limits the temperature of the water by the amount of fuel consumed, but also reduces the amount of fuel far below the maximum at which spud M is set.

The arrangement of the relatively tall, narrow stack, properly insulated, with the heat transfer coils 26 and 27 which preferably are so wound that their convolutions will act as baffles and the relatively large, heavy flame resistant and acid resistant holding tubes 28 and 29 also reduce the amount of heat and, therefore, the amount of fuel consumption to the minimum.

The insulation of tank T also keeps down fuel consumption and the arrangement of the burner 51 with reference to the stack and heating tubes is such that, while it delivers the greatest amount of heat with the least amount of wear and tear, rust and soot creation, if and when the heat transfer coils 26 and 27 or the tubes 28 and 29 become defective or lose efficiency from any cause, they can quickly be removed and replaced by new ones.

We claim:

1. The combination in a slow recovery circulating water heating system; of an insulated storage tank including a cold water inlet and a hot water outlet pipe; with a converter including an insulated heating stack of relatively small diameter with reference to its height, a water heating member which comprises a water coil which extends from the bottom to the top of the stack, the top of the heating member including a relatively heavy holding tube and the bottom of the heating member including a relatively heavy holding tube, both of said holding tubes extending through the side of the stack and through the side of the tank, thereby supporting the converter and connecting it only through the tank with the cold water inlet and the hot water outlet pipes, and a fluid fuel supply pipe which terminates in a burner positioned at the bottom of the heating member under the bottom holding tube, said burner, the fuel supply pipe, the heating member and stack being so adjusted and proportioned as to effect complete combustion and to slowly and evenly heat the entire heating member and to normally heat the contents of the tank and other parts; together with a thermostat controlled by the temperature of the circulating water and controlling a fuel regulating valve in the fuel supply pipe to limit the temperature of the water and the amount of fuel consumed.

2. The combination in a slow recovery circulating water heating system; of an insulated storage tank having a cold water inlet and a hot water outlet pipe; with a converter including an insulated heating stack of relatively small diameter with reference to its height, a water heating member which comprises a water coil which extends from near the bottom to near the top of the stack, the top of the heating member connecting with a holding tube and the bottom of the heating member connecting with another holding tube, said tubes extending through the insulated walls of the stack and of the tank and being, through the tank, the only connection between the heating member and the cold water inlet and the hot water outlet; and fluid fuel heating means to heat the water heating member so adjusted and proportioned as to normally slowly heat the contents of the tank and of the other parts, and means to limit the maximum temperature of the water.

MICHAEL W. BELKA.
JOHN F. WOOD.